(12) United States Patent
Hiebert et al.

(10) Patent No.: US 12,179,568 B1
(45) Date of Patent: Dec. 31, 2024

(54) SPROCKET AND LOCKING MECHANISM FOR TRAILER TARP BOX

(71) Applicant: Norstar Trailers, LLC, Brookston, TX (US)

(72) Inventors: Franz Hiebert, Cuauhtémoc Chihuahua (MX); Lionel Daniel Schmitt, Sumner, TX (US); Aron Guenter, Cuauhtémoc Chihuahua (MX)

(73) Assignee: Norstar Trailers, LLC, Brookston, TX (US)

( * ) Notice: Subject to any disclaimer, the term of this patent is extended or adjusted under 35 U.S.C. 154(b) by 0 days.

(21) Appl. No.: 18/783,083

(22) Filed: Jul. 24, 2024

(51) Int. Cl.
*B60J 7/08* (2006.01)
*B62D 33/027* (2006.01)

(52) U.S. Cl.
CPC .......... *B60J 7/085* (2013.01); *B62D 33/0273* (2013.01)

(58) Field of Classification Search
CPC ... B60J 7/085; B60J 7/068; B60J 7/102; B60J 7/104; B60J 7/10; B60J 7/12; B60J 11/02; B60P 7/04; E06B 9/76
USPC .......... 296/98, 100.01, 100.11–100.18, 101, 296/136.01, 136.1, 136.13; 135/903; 160/309
See application file for complete search history.

(56) References Cited

U.S. PATENT DOCUMENTS

| | | | | |
|---|---|---|---|---|
| 1,941,214 A | * | 12/1933 | Kusterle | A47C 20/042 74/544 |
| 4,893,864 A | * | 1/1990 | Bailey | B60P 7/04 296/98 |
| 5,129,698 A | * | 7/1992 | Cohrs | B60P 7/083 242/396.4 |
| 5,174,625 A | * | 12/1992 | Gothier | B60J 7/085 242/389 |
| 5,211,440 A | * | 5/1993 | Cramaro | B60J 7/085 160/188 |
| 5,487,584 A | | 1/1996 | Jespersen | |
| 5,823,067 A | * | 10/1998 | Clarys | B60J 7/085 74/546 |
| 6,347,826 B1 | | 2/2002 | Horner et al. | |

(Continued)

FOREIGN PATENT DOCUMENTS

| | | |
|---|---|---|
| CA | 2116787 C | 9/1994 |
| DE | 202016002322 U1 * | 6/2016 |

OTHER PUBLICATIONS

Donovan Enterprises, "Long Arm Jr. (Part # 1164 / 1164-102) for Trailers up to 38' Long," Owner's Manual, Feb. 2010, 9 pages.

(Continued)

*Primary Examiner* — Amy R Weisberg
*Assistant Examiner* — Veronica M Shull

(57) ABSTRACT

A sprocket fits over a portion of or is fixedly coupled to a tarp shaft around which a trailer tarp is rolled. The sprocket includes a transverse bore for receiving an end of a crank rod, which is spring-biased to engage pins through the crank rod end with one of two sets of grooves in the sprocket surface surrounding the transverse bore. The crank can therefore be moved between a deployed position for use and a stowed position for travel. The opposite end of the sprocket includes projecting locking teeth for engaging with a locking mechanism preventing rotation of the sprocket and tarp shaft. Optionally, pawls may operate with the locking teeth to provide bidirectional ratcheting.

20 Claims, 20 Drawing Sheets

(56) References Cited

U.S. PATENT DOCUMENTS

| | | | |
|---|---|---|---|
| 6,478,361 B1 * | 11/2002 | Wood | B61D 39/006 296/98 |
| 6,481,779 B1 * | 11/2002 | Gothier | B60J 7/062 296/105 |
| 6,641,199 B1 * | 11/2003 | Hicks | B60J 7/085 296/105 |
| 6,742,828 B2 | 6/2004 | Smith | |
| 6,805,395 B2 * | 10/2004 | Royer | B60J 7/085 24/714 |
| 6,974,176 B2 | 12/2005 | Smith et al. | |
| 7,296,842 B2 | 11/2007 | Growcock et al. | |
| D585,917 S | 2/2009 | Akdag et al. | |
| D591,319 S | 4/2009 | Akdag et al. | |
| 7,513,561 B2 * | 4/2009 | Royer | B60J 7/085 296/100.01 |
| 8,141,498 B2 | 3/2012 | Barr et al. | |
| 8,172,477 B2 | 5/2012 | Damsi | |
| 8,235,447 B2 | 8/2012 | Damsi | |
| 8,567,848 B2 | 10/2013 | Damsi | |
| 8,631,746 B2 | 1/2014 | Knight et al. | |
| 8,888,535 B2 | 11/2014 | Knight et al. | |
| 9,088,311 B2 | 7/2015 | Knight et al. | |
| 9,283,832 B2 | 3/2016 | Knight et al. | |
| 9,346,343 B1 | 5/2016 | Knight et al. | |
| D790,333 S | 6/2017 | Knight et al. | |
| 9,716,518 B2 | 7/2017 | Knight et al. | |
| 9,847,797 B2 | 12/2017 | Knight et al. | |
| 10,322,870 B1 | 6/2019 | Knight et al. | |
| 10,457,191 B1 | 10/2019 | Tennant | |
| 10,899,205 B1 | 1/2021 | Knight et al. | |
| 11,358,451 B2 * | 6/2022 | Boutin | B60P 7/04 |
| 2002/0021018 A1 * | 2/2002 | Royer | B60J 7/085 296/98 |
| 2011/0078958 A1 | 4/2011 | Knight et al. | |
| 2012/0080968 A1 | 4/2012 | Knight et al. | |
| 2015/0246632 A1 | 9/2015 | Jones, Jr. | |
| 2019/0270365 A1 * | 9/2019 | Royer | E05F 11/34 |
| 2022/0153071 A1 | 5/2022 | Vega | |
| 2023/0364726 A1 | 11/2023 | Crabb et al. | |

OTHER PUBLICATIONS

ShurCo, "Shur-Trak for End Dumps, Belly Dumps, and Dump Bodies," Owner's Manual Rev. A, 18 pages.

ShurCo, Tarp Systems & Accesories, "End Dumps, Belly Dumps & Dump Bodies," Owner's Manual Rev. MM, 52 pages.

ShurCo, Tarp Systems & Accesories, "Arm-Matic: Arm System Belly Dumps, End Dumps, Dump Bodies & Pups," Owner's Manual Rev. K, 48 pages.

Donovan Enterprises, Tarp Systems, Parts & Tarps, "Arm-Lok Trailer Kit," Owner's Manual, Rev. A, 12 pages.

Donovan Enterprises, "2000SR Tarp Housing Installation Instructions," 3 pages.

\* cited by examiner

SPROCKET AND LOCKING MECHANISM FOR TRAILER TARP BOX

TECHNICAL FIELD

This disclosure relates generally to trailer tarp manual manipulation. More specifically, this disclosure relates to a sprocket that facilitates management of a crank handle and position locking with optional bidirectional ratcheting.

BACKGROUND

Open-top dump trailers are frequently equipped with a tarp to protect the contents being transported from exposure to weather and the like and to prevent contents such as gravel from being ejected as the trailer passes over bumps. One example of a trailer tarp system uses long, pivoting arms-sometimes telescoping and/or bent-on each side of the trailer to extend and retract the tarp over the open top of the trailer. Other designs simply roll the tarp across the open top, without the pivoting arms. In either case, the tarp may be manually rolled into a tarp box when retracted.

SUMMARY

A sprocket fits over a portion of or is fixedly coupled to a tarp shaft around which a trailer tarp is rolled. The sprocket includes a transverse bore for receiving an end of a crank rod, which is spring-biased to engage pins through the crank rod end with one of two sets of grooves in the sprocket surface surrounding the transverse bore. The crank can therefore be moved between a deployed position for use and a stowed position for travel. The opposite end of the sprocket includes projecting locking teeth for engaging with a locking mechanism preventing rotation of the sprocket and tarp shaft. Optionally, pawls may operate with the locking teeth to provide bidirectional ratcheting.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 4E, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

Figure 1A:
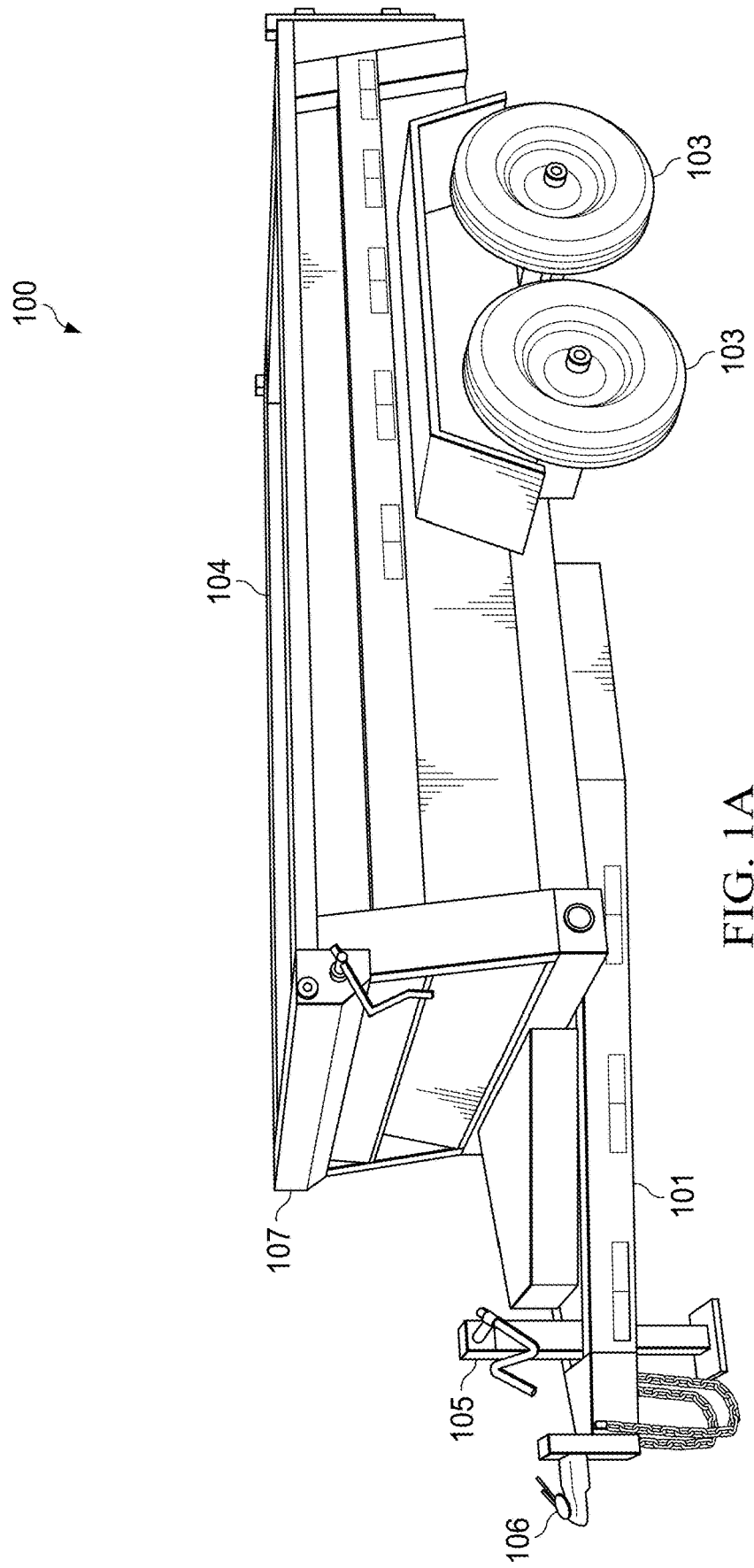
FIGS. 1A and 1B are perspective views of a dump trailer having a tarp according to embodiments of the present disclosure.
Figure 1B:
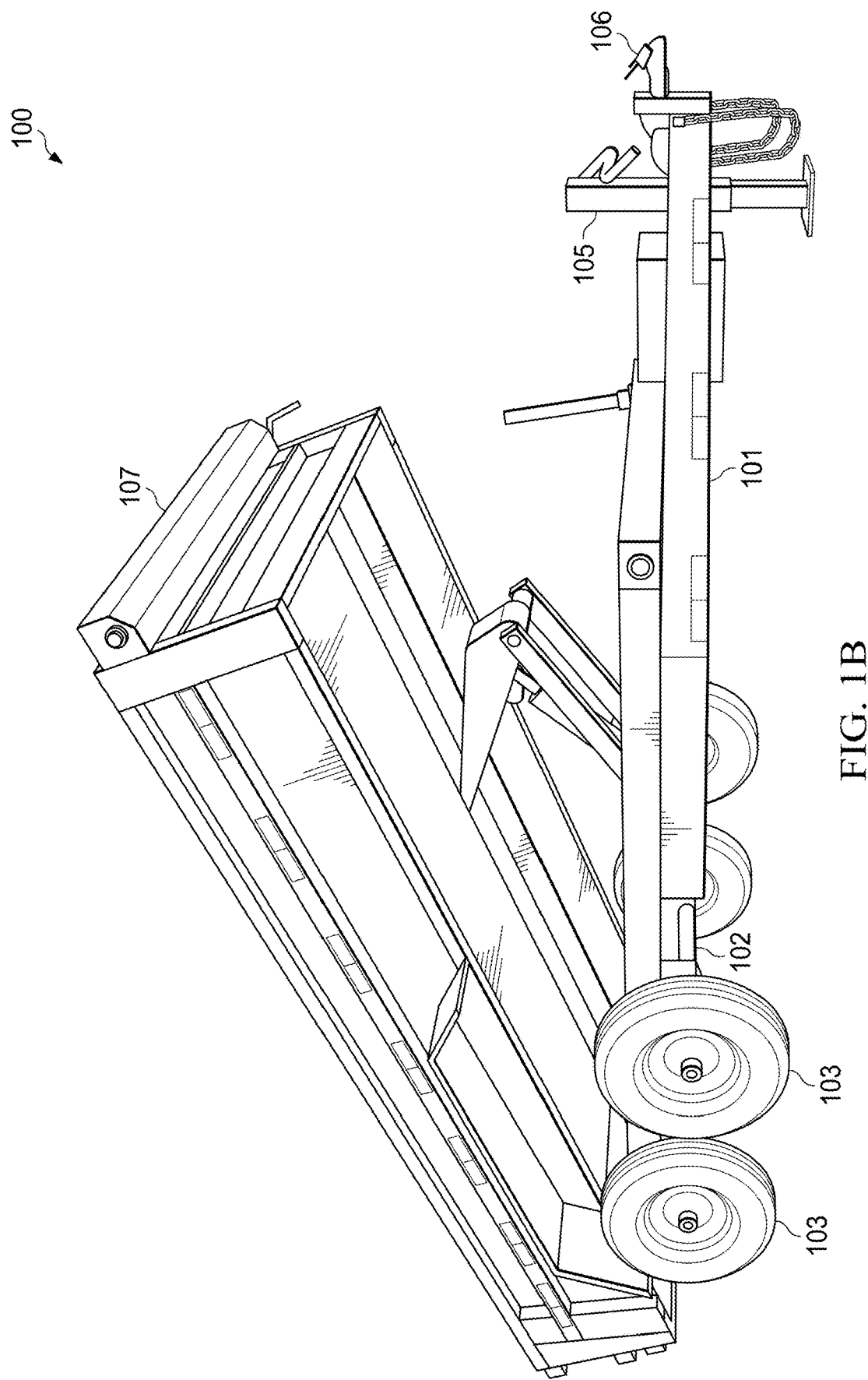

FIGS. 1A and 1B are perspective views of a dump trailer having a tarp according to embodiments of the present disclosure. FIGS. 1A and 1B are for illustration and explanation only. FIGS. 1A and 1B do not limit the scope of this disclosure to any particular implementation.

The exemplary trailer 100 in FIGS. 1A and 1B includes a frame 101 on which are mounted axles 102 (only one of which is visible in FIG. 1B) and wheels 103, forming a dual (or "tandem") axle trailer. Rotatably mounted on the frame 101 is a box structure 104 including a bed, sidewalls, a front, and a rear gate. The rear gate may be configured to pivot about an upper region, so that material on the bed of the trailer 100 slides off through an opening between the bed and the bottom of the rear gate under the force of gravity when the box structure is elevated. A front stand 105 supports the trailer 100 when the trailer is not connected to a vehicle by hitch 106.

The trailer 100 includes a tarp winding system 107 at the front thereof, extending across a width of the trailer in the example shown. The tarp winding system 107 rolls a tarp around a central shaft and, in the exemplary embodiment, into a protective housing, which has an elongated form that is generally square or rectangular in cross-section. At one end of the shaft is a crank handle connected to the central shaft about which the tarp is rolled. In the example shown, the tarp winding system 107 is used in conjunction with a roll-top tarp that extends, when the tarp is deployed, across the open top of the box structure for the trailer 100 and which is deployed or retracted by being unwound from or wound into the protecting housing of the tarp system 107. In alternative embodiments, the tarp system 107 may be utilized in conjunction with a pole or long arm tarp connected to pivoting arms as described above.

FIGS. 2A through 2I are various views of a sprocket and locking mechanism for a tarp system on a trailer in accordance with embodiments of the present disclosure. FIGS. 2A through 2I are for illustration and explanation only. FIGS. 2A through 2I do not limit the scope of this disclosure to any particular implementation.

Figure 2A:
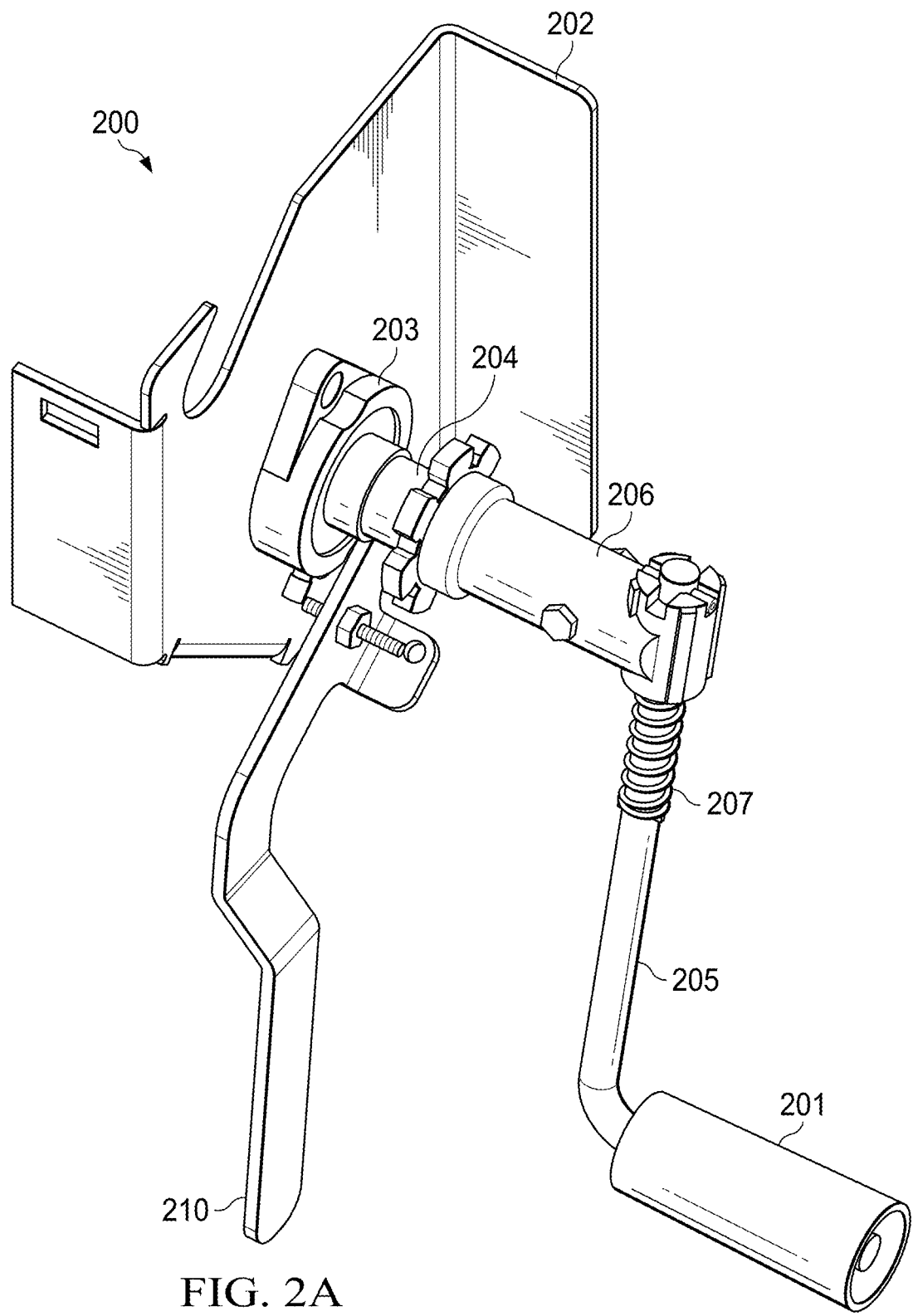
FIGS. 2A through 2I are various views of a sprocket and locking mechanism for a tarp system on a trailer in accordance with embodiments of the present disclosure.
Figure 2B:
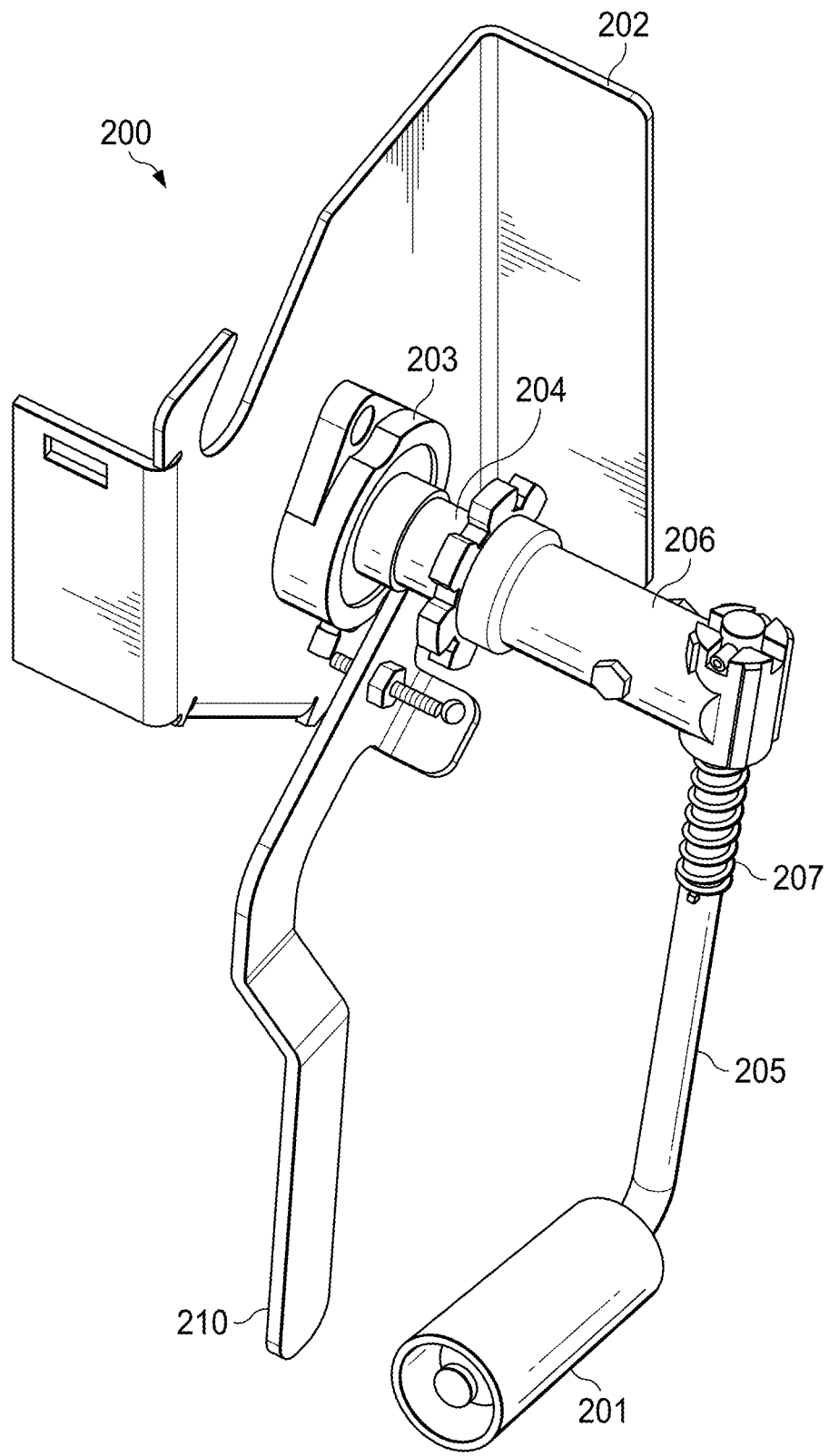
Figure 2C:
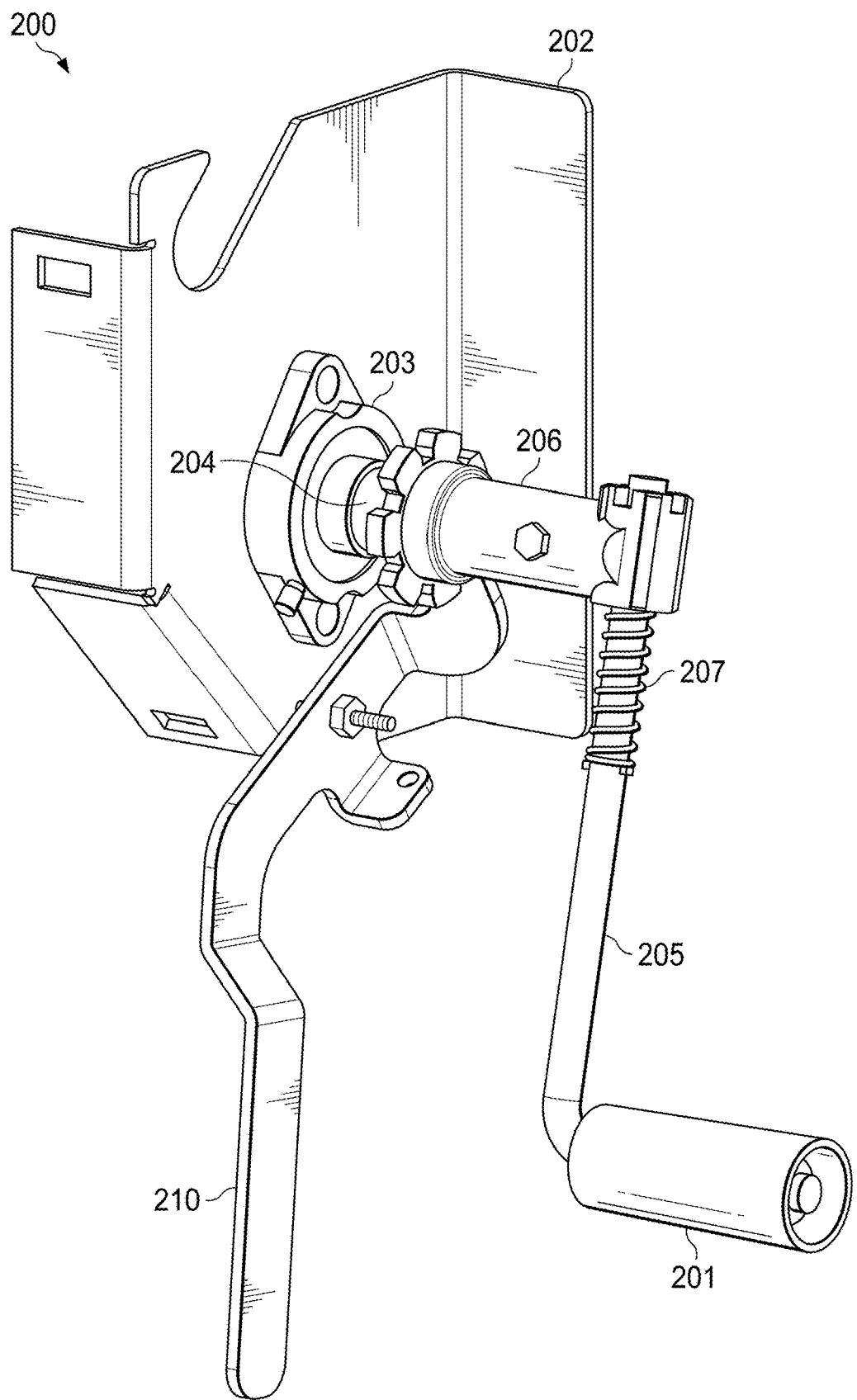
Figure 2D:
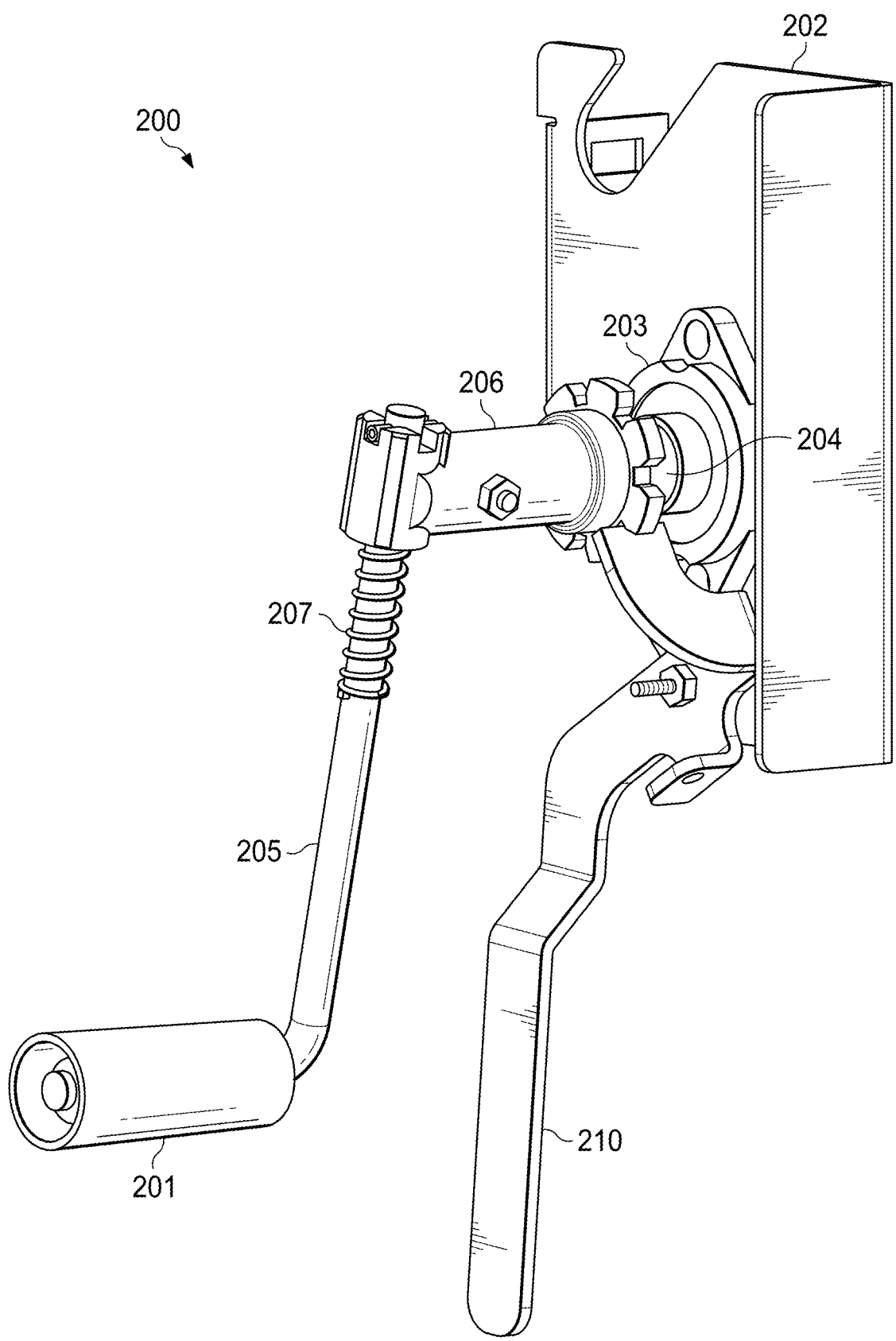
Figure 2E:
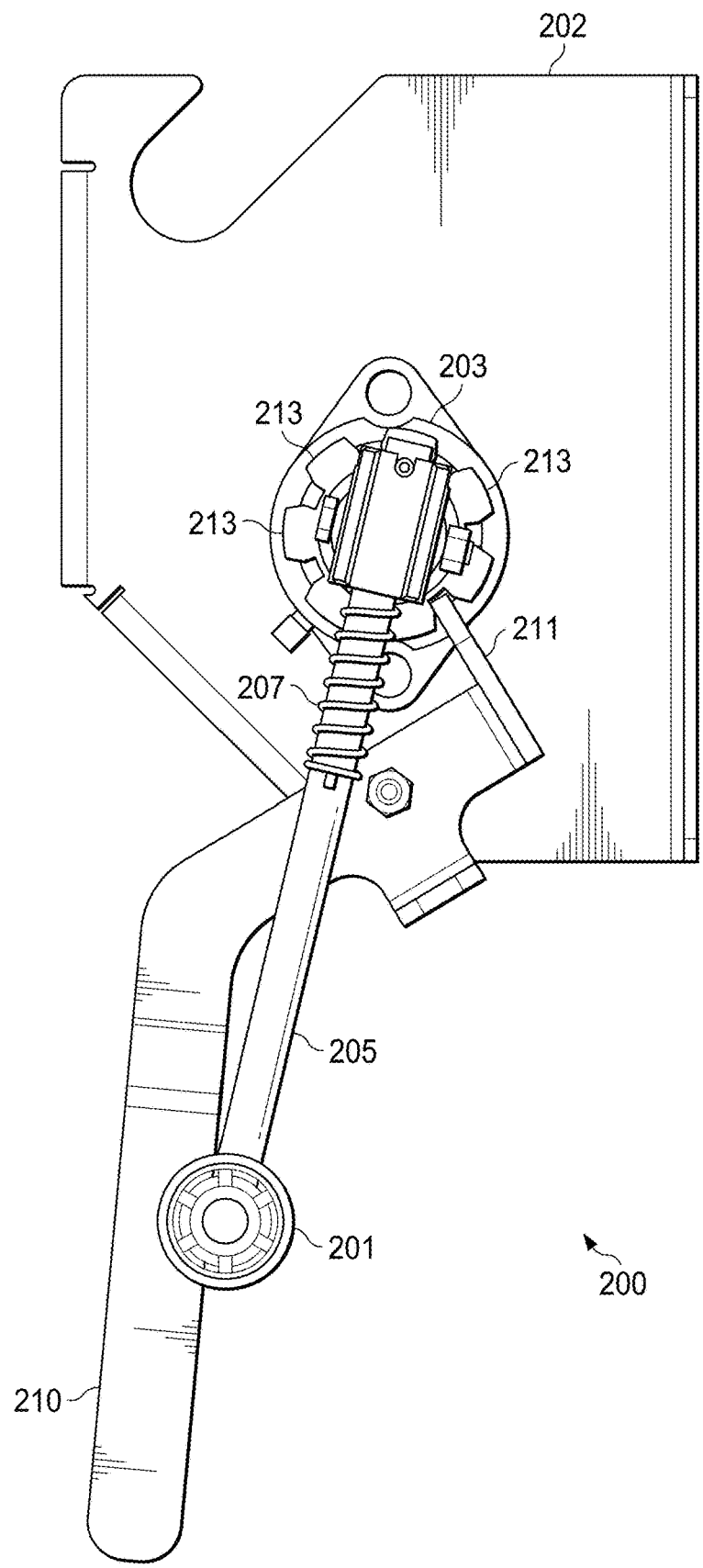
Figure 2F:
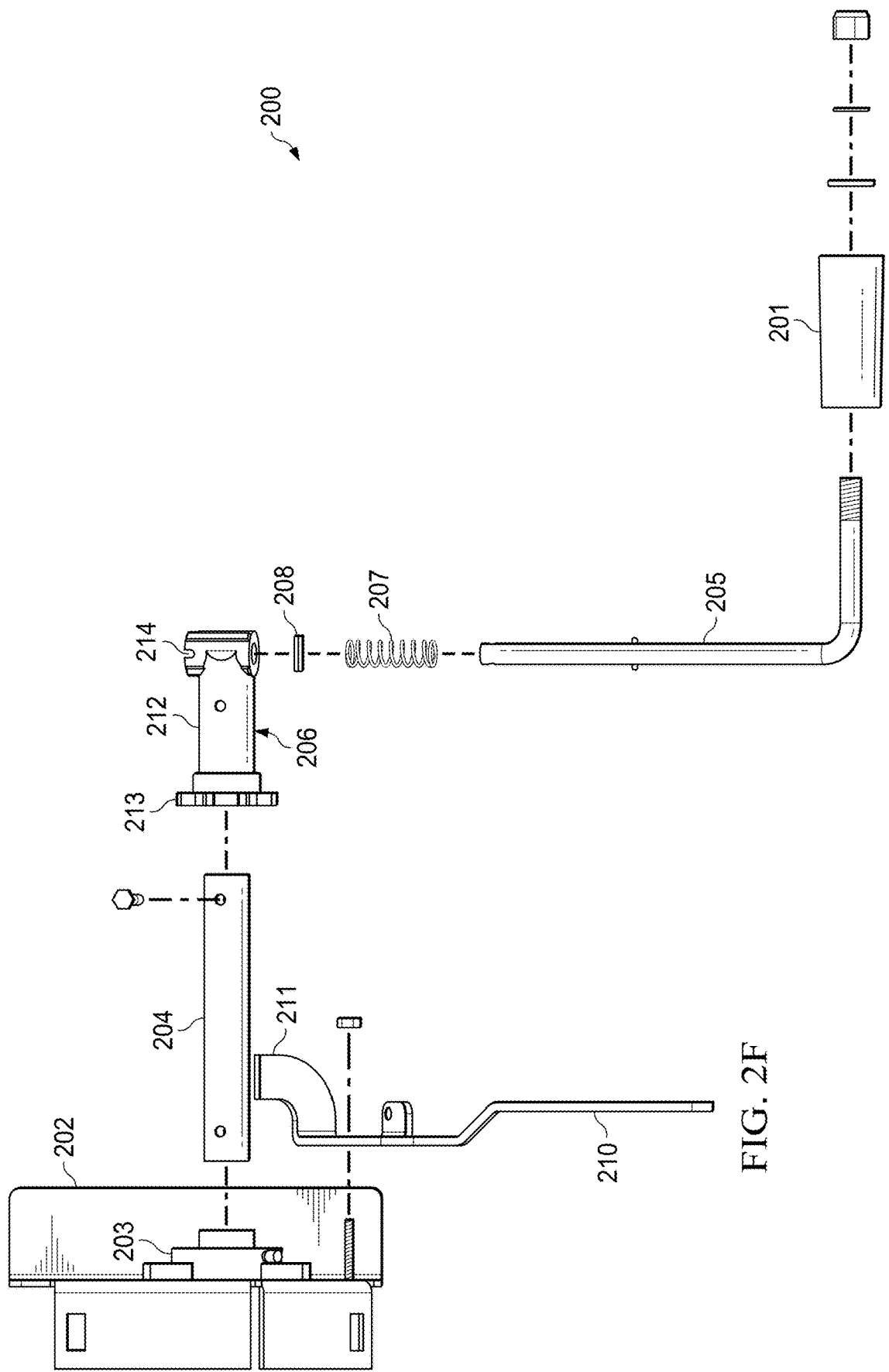
Figure 2G:
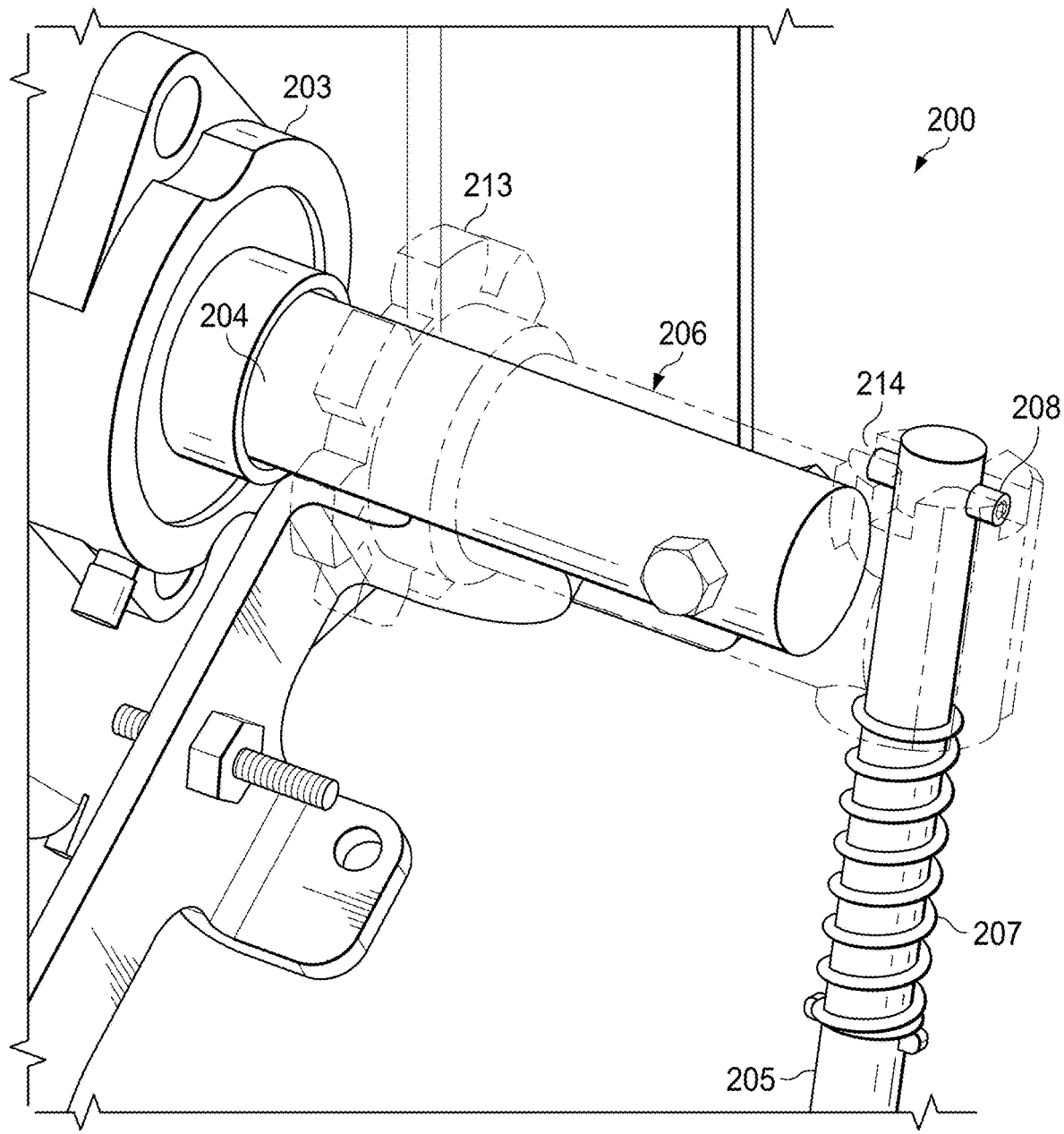
Figure 2H:
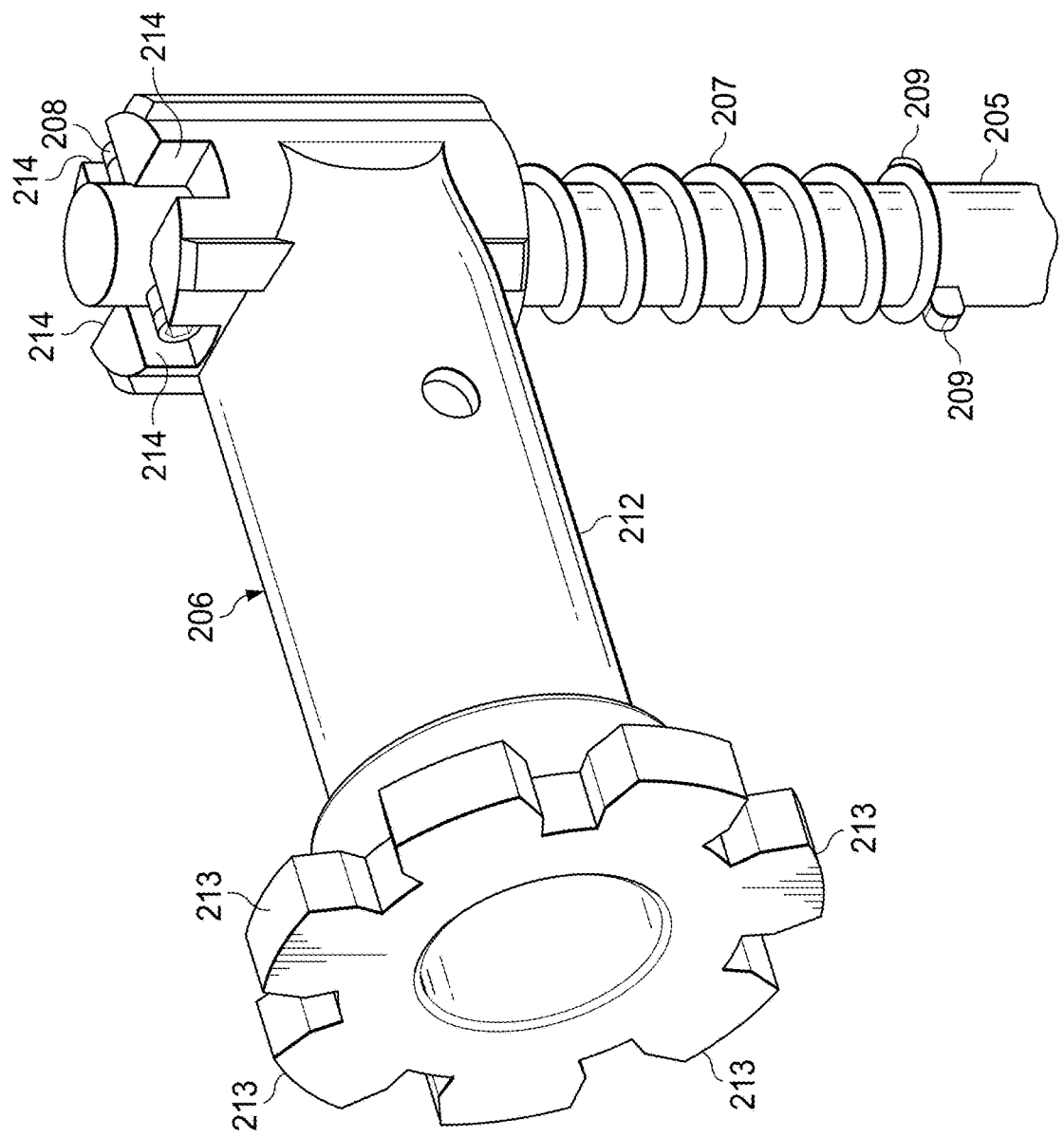
Figure 2I:
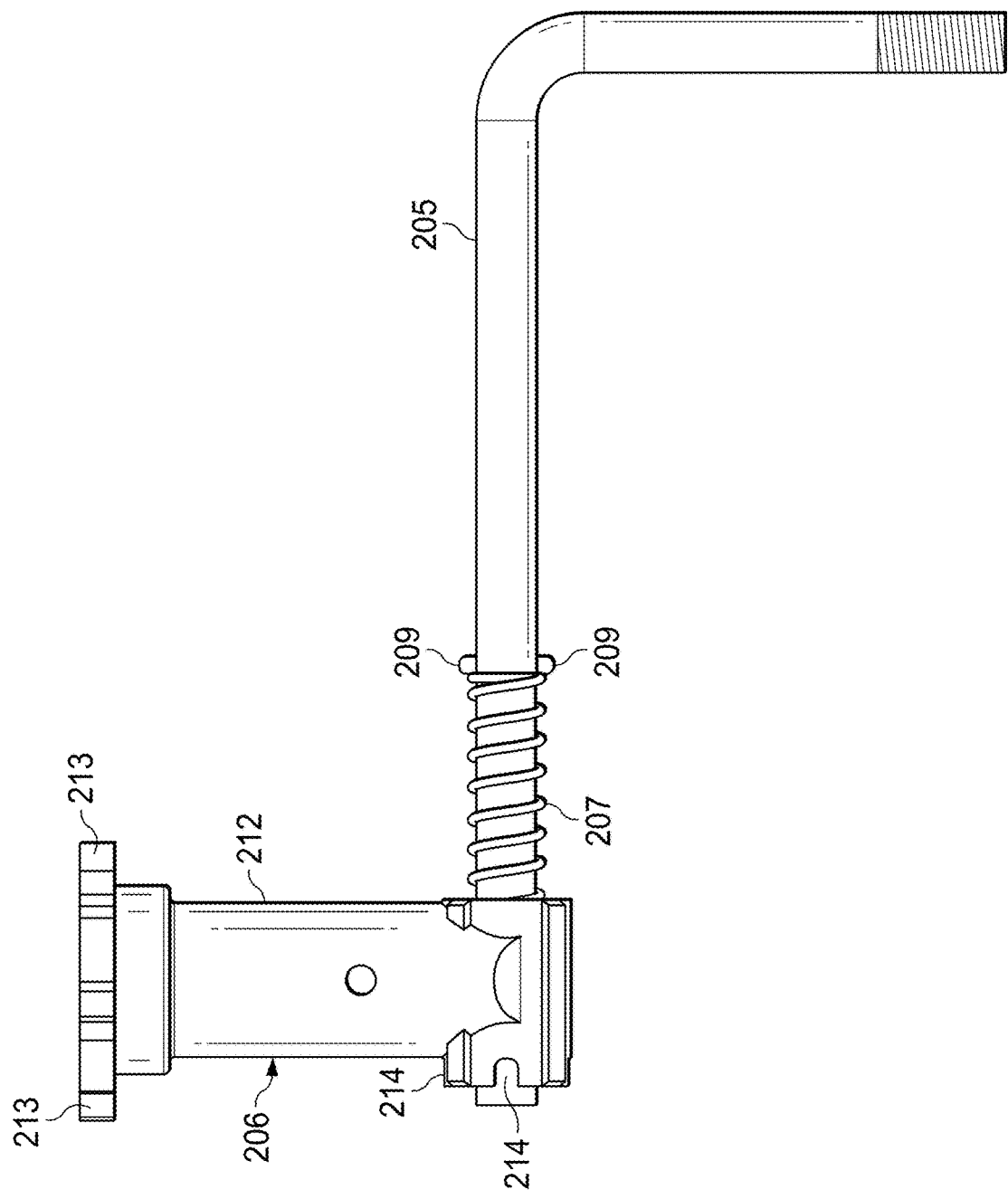

FIG. 2A is a perspective view of the sprocket and locking mechanism 200 with the crank handle 201 deployed, while FIG. 2B is a perspective view of the sprocket and locking mechanism 200 with the crank handle 201 stowed. FIGS. 2C and 2D are alternative perspective views of the sprocket and locking mechanism 200 with the crank handle 201 deployed in both. FIG. 2E is an end elevation view of the assembled sprocket and locking mechanism 200, while FIG. 2F is a side elevation view of the sprocket and locking mechanism 200 when exploded. FIG. 2G is an enlarged perspective view of the assembled sprocket and locking mechanism 200 with the sprocket shown in phantom. FIGS. 2H and 2I depict the sprocket and crank rod, only, for the sprocket and locking mechanism 200.

The sprocket and locking mechanism 200 of FIGS. 2A through 2I includes a mounting bracket 202 for securing the mechanism on an upper edge of the front wall for the trailer (e.g., by welding), and for supporting an optional housing enclosing the tarp shaft (not shown) and any portions of the tarp attached to and/or rolled around the tarp shaft (also not shown). A collar 203 may be mounted on a portion of the mounting bracket 202, for supporting a connecting shaft 204 for connection to the tarp shaft, around which the tarp is rolled and unrolled. It should be noted that the connecting shaft 204 need not be a separate structure from the tarp shaft, but may instead be integrally formed with the tarp shaft and merely have a smaller circumference than the tarp shaft.

In the sprocket and locking mechanism 200 of FIGS. 2A through 2I, the crank rod 205 and crank handle 201 are coupled to the connecting shaft 204 by sprocket 206. The crank rod 205 is generally L shaped, with an end received by a hole in the end of the sprocket 206. The crank handle 201 is received over a threaded end of the crank rod 205 farthest from the sprocket 206, and held in place by washer(s) and a nut. The end of the crank rod 205 that is received by the sprocket 206 is also received by a spring 207, which is held on the crank rod 205 between the sprocket 206 and protrusions 209 (e.g., a pin or projecting tabs) located a distance toward the crank handle 201 from the sprocket 206. The spring 207 holds the crank rod 205 in position based on the tension of the spring 207 between the sprocket 206 and the protrusions 209, and a pin 208 through an end of the crank rod 205 that is received by grooves in the socket 206. The sprocket and locking mechanism 200 includes a rotatable locking lever 210 with, at an end closest to the sprocket 206, a flanged locking tab 211.

The sprocket 206, which may be formed of molded plastic or cast and/or machined metal (e.g., steel), slides over an end of the crank rod 205, and is secured to the crank rod 205 by (for example) a threaded bolt and nut extending through both the sprocket 206 and the crank rod 205. The sprocket 206 includes a central shaft 212 that includes an axial bore for receiving one end of the connecting shaft 204, and may include through holes for receiving a threaded bolt securing the sprocket 206 to the connecting shaft 204. One end of the sprocket 206 includes locking teeth 213, for locking the connecting shaft 204 and the tarp shaft coupled thereto against rotation. Movement of the locking lever 210 about the pivot point so that the locking tab 211 is between two adjacent locking teeth 213 (best seen in FIGS. 2D and 2E) accomplishes the desired locking of the connecting shaft 204 and the tarp shaft against rotation. The opposite end of the sprocket 206 includes a bore therethrough that is transverse to the axial direction of the central shaft 212 for the sprocket 206, for receiving an end of the crank rod 205. One face of the sprocket 206 that surrounds the transverse bore includes grooves 214 (best seen in FIG. 2H) extending across the bore, one aligned with the axial direction of the central shaft 212 and the other perpendicular to that direction. The grooves 214 are sized to receive the pin 208 through the end of the crank rod 205, to thereby hold the crank rod 205 in position (under tension of spring 207) with the crank handle 201 either deployed or stowed, as shown in FIGS. 2A and 2B, respectively.

FIGS. 3A through 3D are various views of an alternative sprocket and locking mechanism for a tarp system on a trailer in accordance with embodiments of the present disclosure. FIGS. 3A through 3D are for illustration and explanation only. FIGS. 3A through 3D do not limit the scope of this disclosure to any particular implementation.

Figure 3A:
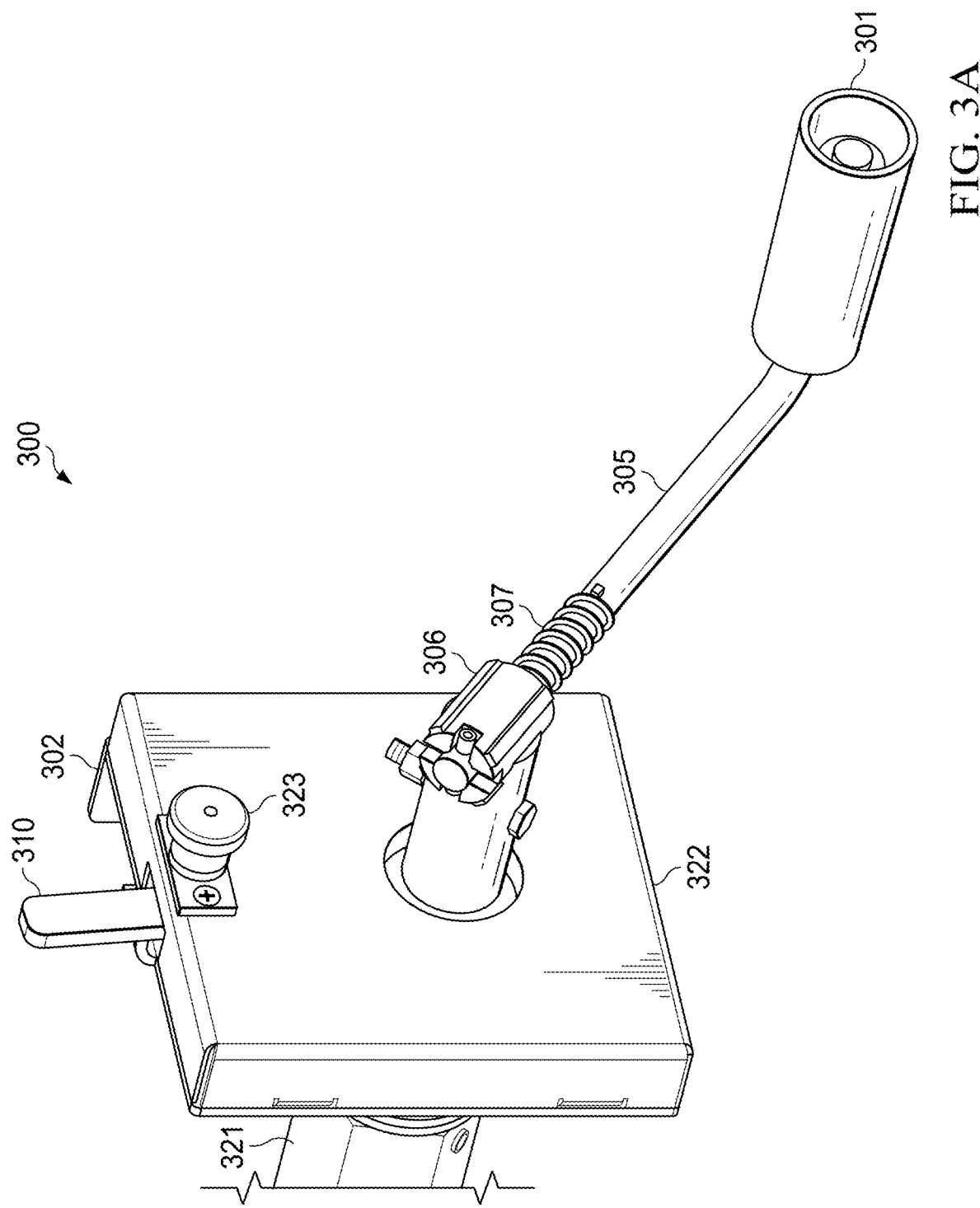
FIGS. 3A through 3D are various views of an alternative sprocket and locking mechanism for a tarp system on a trailer in accordance with embodiments of the present disclosure.
Figure 3B:
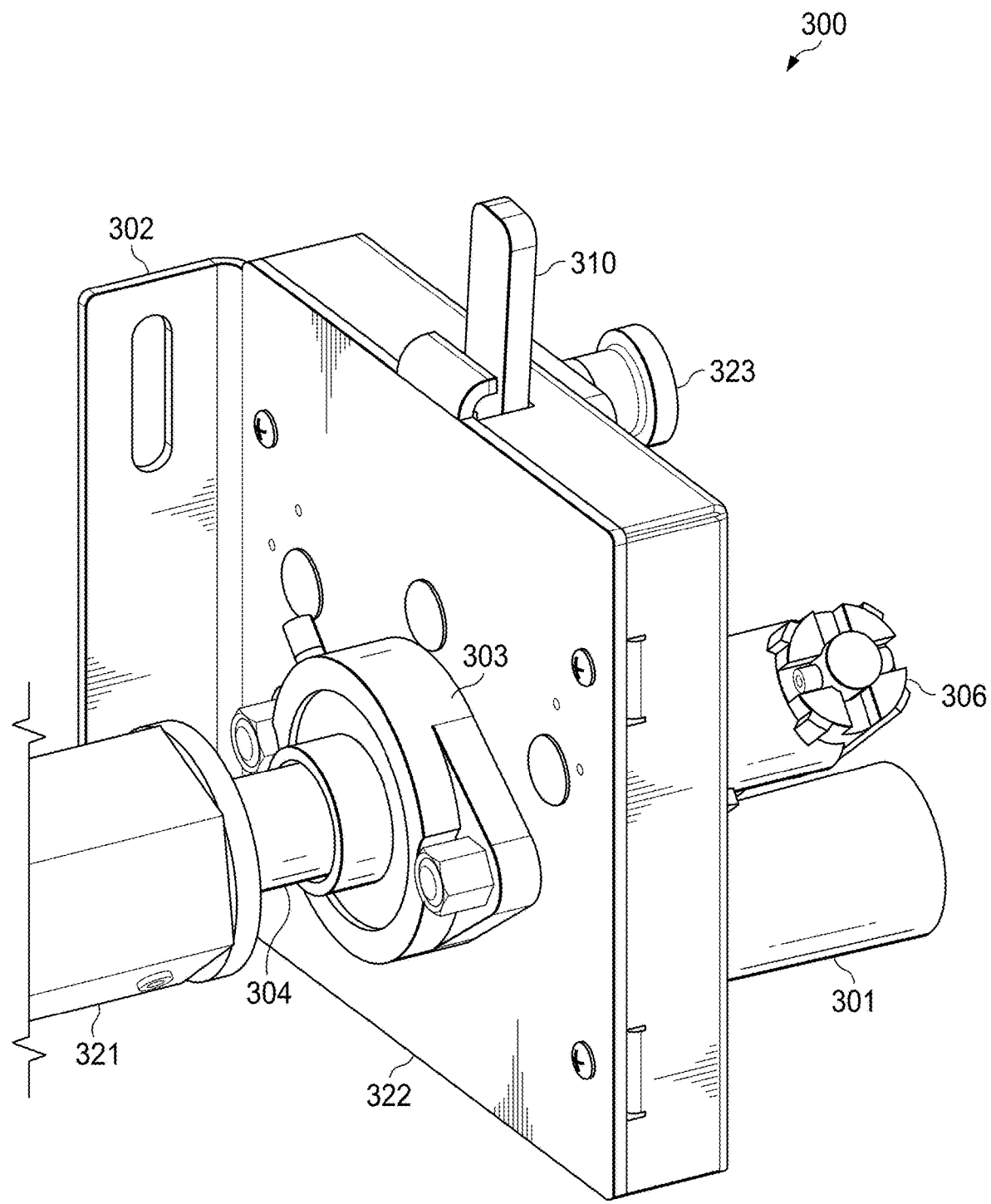
Figure 3C:
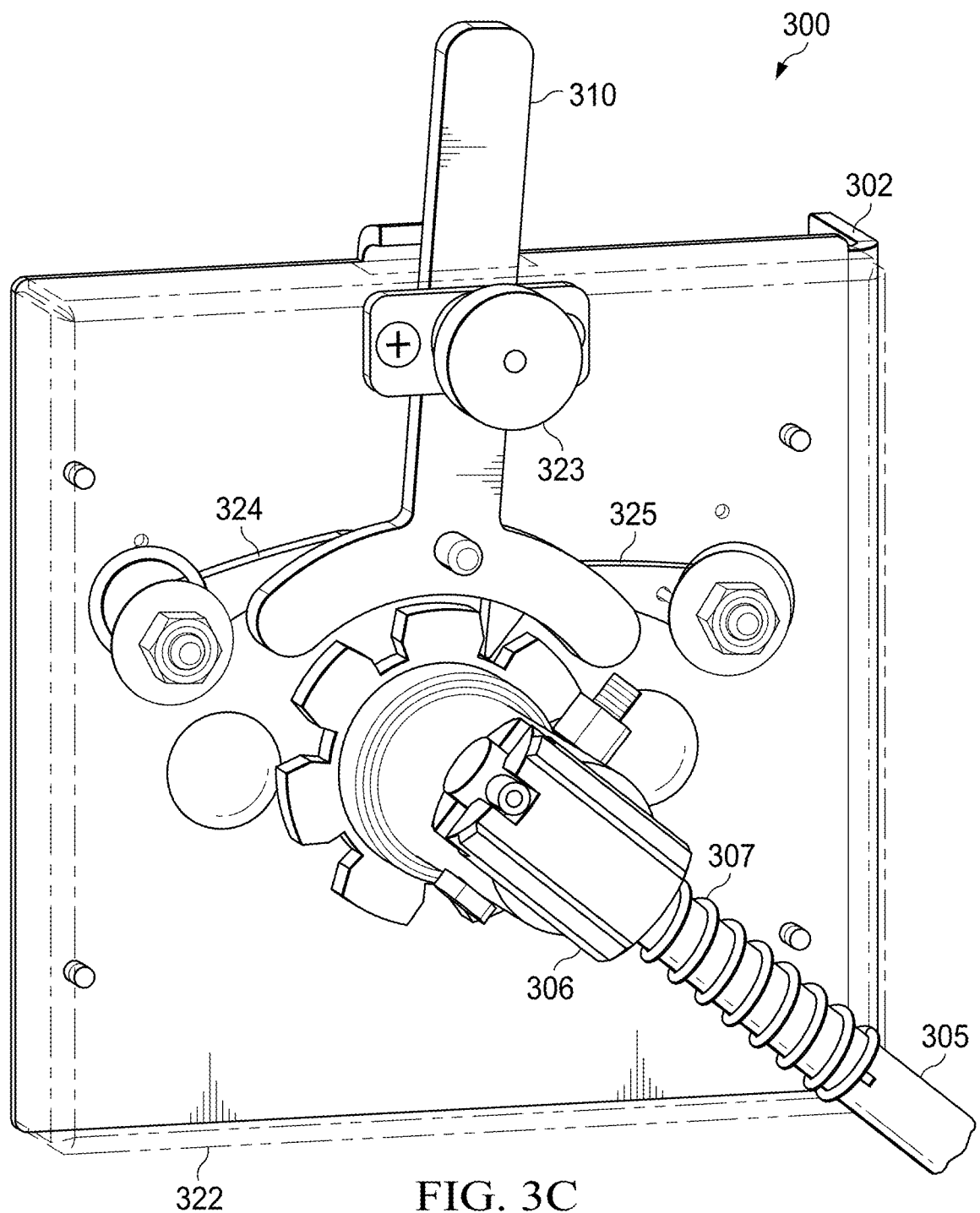
Figure 3D:
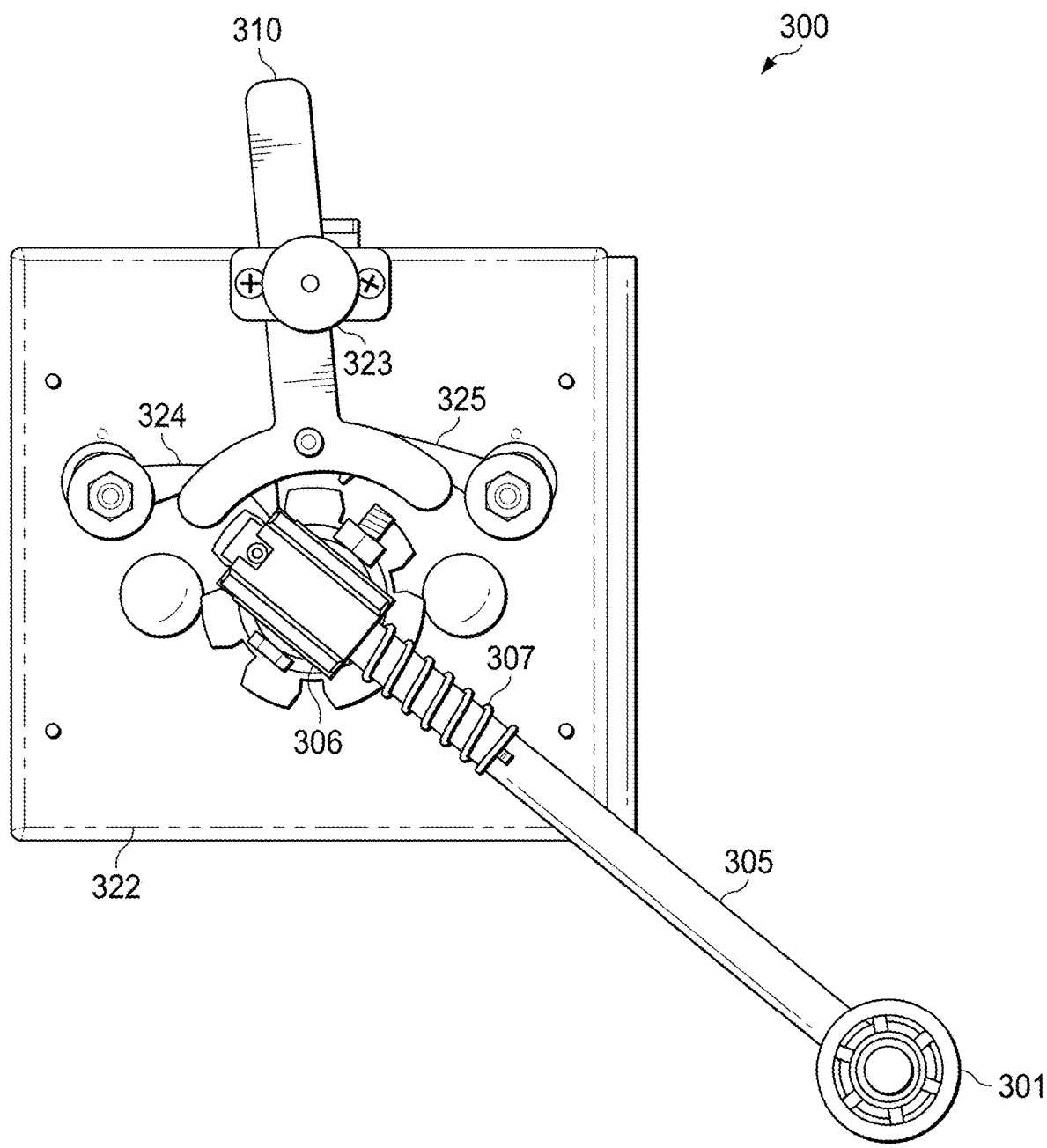

FIG. 3A is a perspective view of the sprocket and locking mechanism 300 with the crank handle 301 deployed, while FIG. 3B is a perspective view of the sprocket and locking mechanism 300 from the opposite side. FIGS. 3C and 3D are alternative views of the sprocket and locking mechanism 300 with one external surface shown as semi-transparent.

The sprocket and locking mechanism 300 of FIG. 3A through 3D is similar to the sprocket and locking mechanism 200 of FIGS. 2A through 2I except for aspects of the locking mechanism. The sprocket and locking mechanism 300 includes a crank handle 301, a mounting bracket 302, a collar 303, a connecting shaft 304, a crank rod 305, a sprocket 306, a spring 307, and a rotatable locking lever 310, each structured and functioning in substantially the same way as the counterpart components in the sprocket and locking mechanism 200. The tarp shaft 321 described above is visible in FIGS. 3A and 3B, coupled to the connecting shaft 304.

Unlike the sprocket and locking mechanism 200 of FIGS. 2A through 2I, the sprocket and locking mechanism 300 of FIG. 3A through 3D includes a housing 322 enclosing a portion thereof. The sprocket 306 extends through a hole in the housing 322, with the locking teeth inside the housing 322. The housing 322 protects the locking mechanism, and may obviate the need for a housing around entire tarp shaft 321 and the tarp. The sprocket and locking mechanism 300 also includes a locking knob 323 on a threaded shaft that is tightened against the rotatable locking lever 310 to prevent movement of that lever.

The sprocket and locking mechanism 300 further includes two spring-biased pawls 324, 325 that are moved into or out of engagement with the locking teeth on the sprocket 306 by movement of the locking lever 310. One pawl 324 may be moved into engagement with the locking teeth as shown in FIG. 3D, by movement of the locking lever 310 to one extreme. The other pawl 325 may be moved into engagement with the locking teeth as shown in FIG. 3C, by movement of the locking lever 310 to the opposite extreme. When either one of pawls 324, 325 is moved into engagement with the locking teeth, a rachet mechanism is formed allowing rotation of the connecting shaft 304 and the tarp shaft 321 in one direction, only. Optionally, both pawls 324, 325 may be moved into engagement with the locking teeth by movement of the locking lever 310 to a middle location between the two extremes, locking the connecting shaft 304 and the tarp shaft 321 against rotation in either direction.

FIGS. 4A through 4E are various views of another alternative sprocket and locking mechanism for a tarp system on a trailer in accordance with embodiments of the present disclosure. FIGS. 4A through 4E are for illustration and explanation only. FIGS. 4A through 4E do not limit the scope of this disclosure to any particular implementation.

Figure 4A:
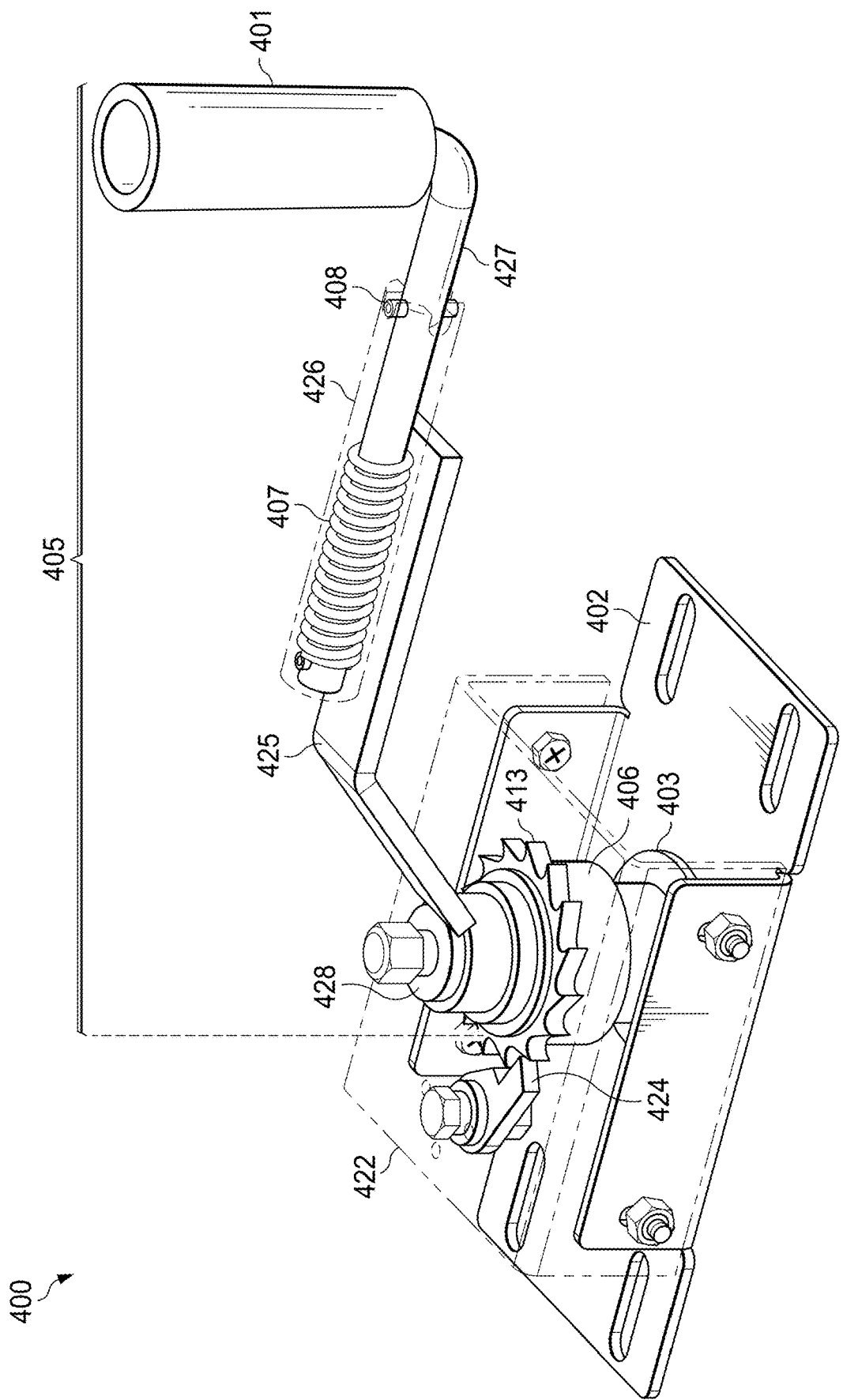
FIGS. 4A through 4E are various views of another alternative sprocket and locking mechanism for a tarp system on a trailer in accordance with embodiments of the present disclosure.
Figure 4B:
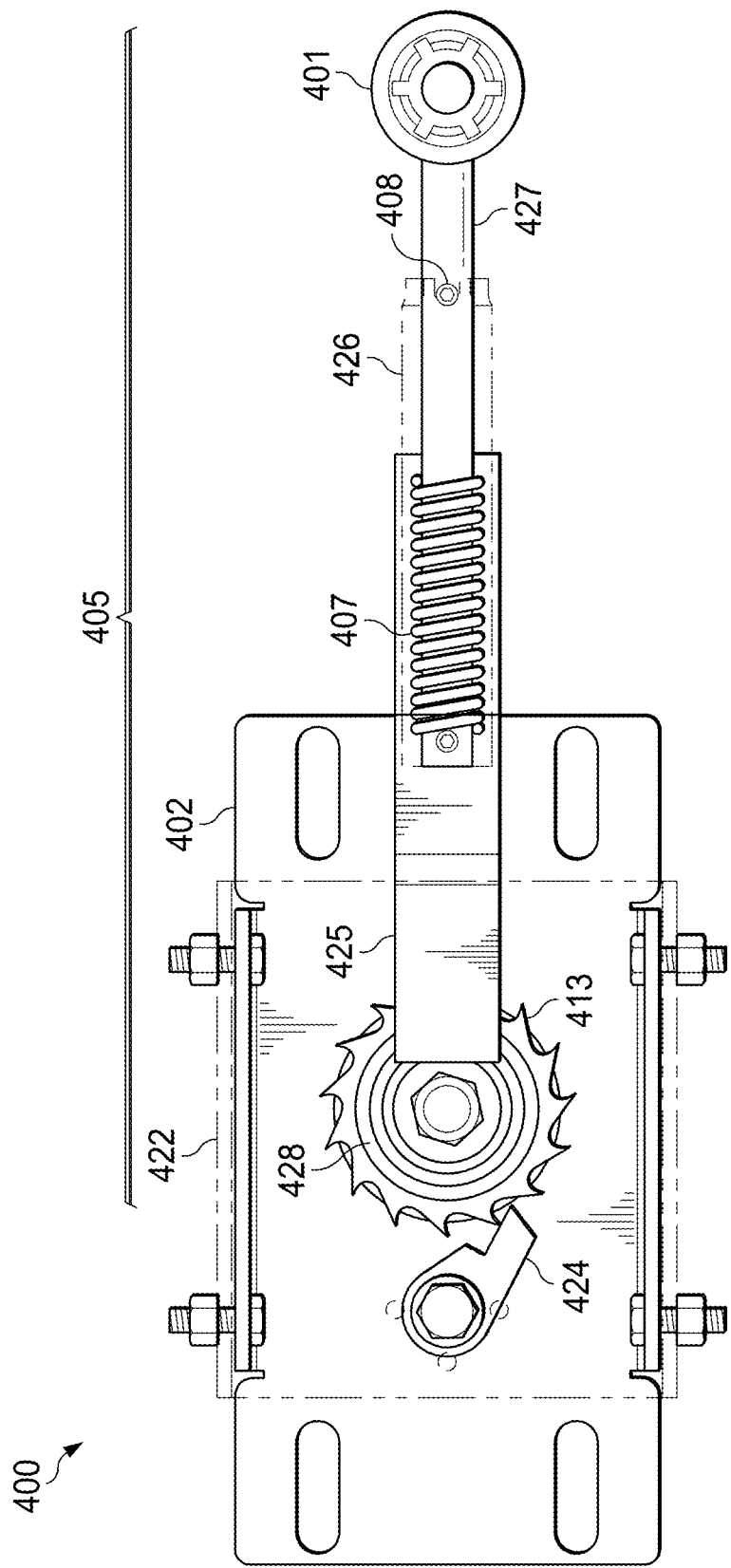
Figure 4C:
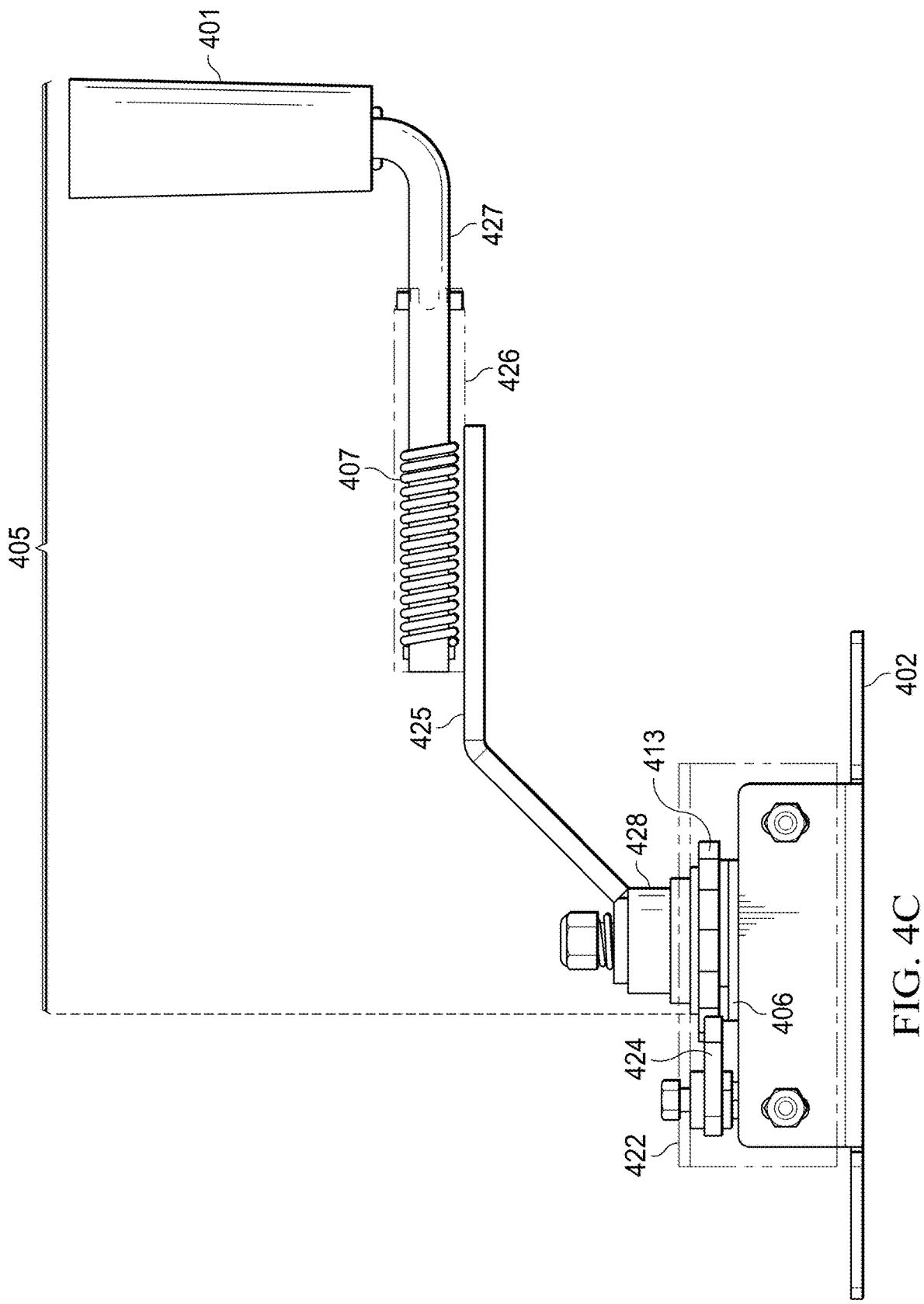
Figure 4D:
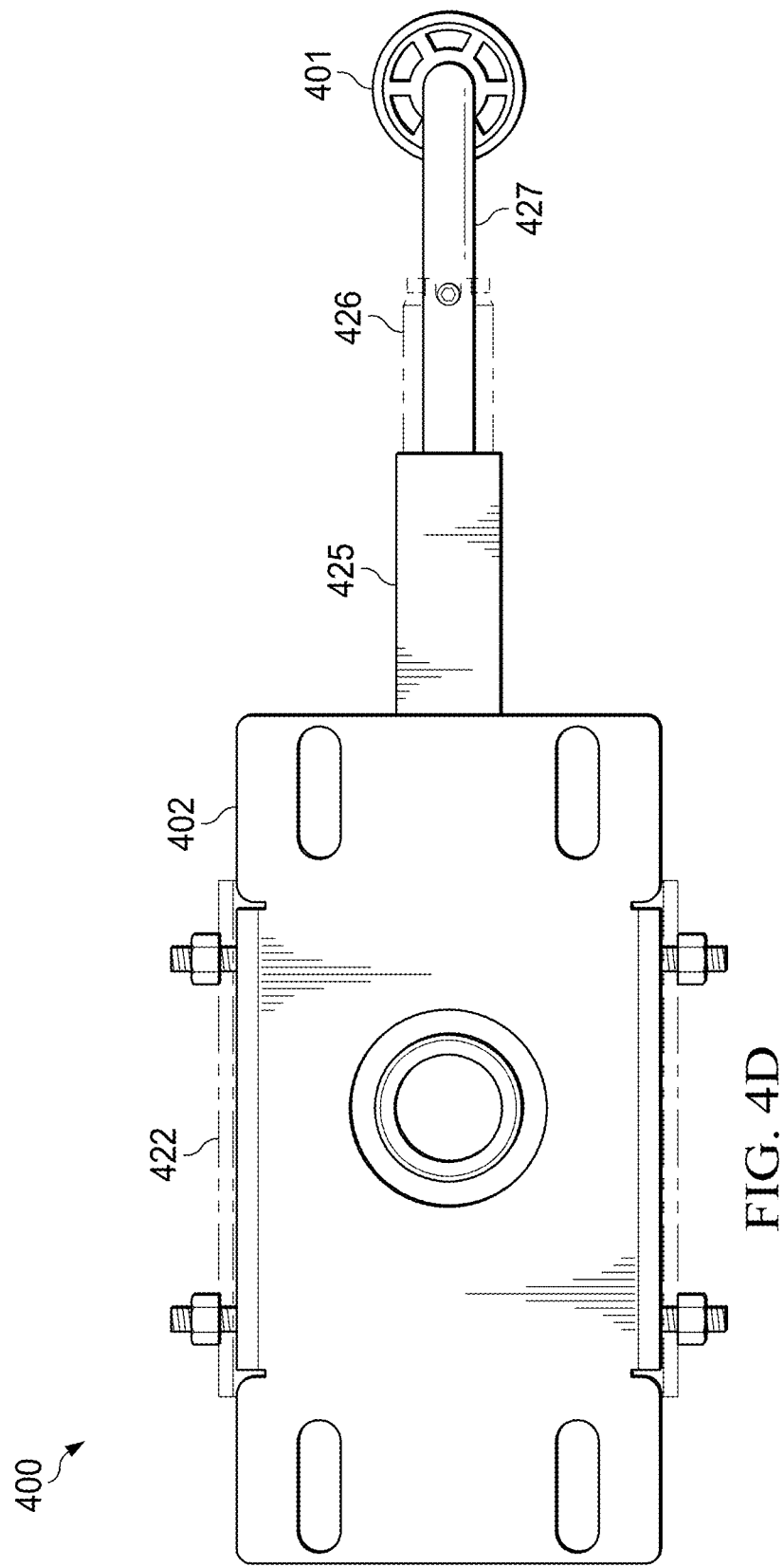
Figure 4E:
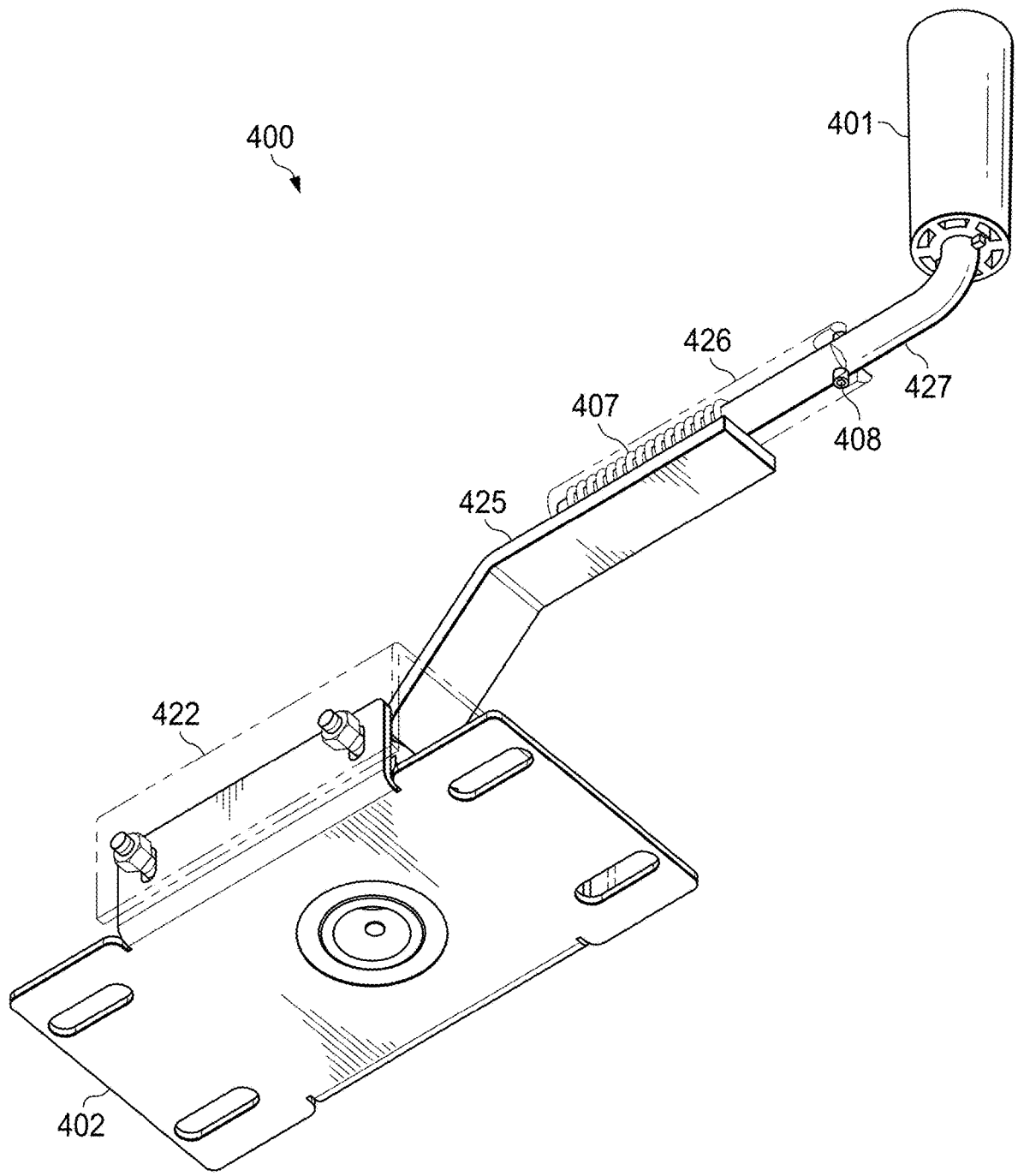

FIG. 4A is an upper perspective view of the sprocket and locking mechanism 400 with the crank handle 301 deployed. FIG. 4B is a top plan view, FIG. 4C is a side elevation view, and FIG. 4D is a bottom plan view of the sprocket and locking mechanism 400. FIG. 4E is a lower perspective view of the sprocket and locking mechanism 400. The surface of housing cover 422 and the sleeve 426 for crank rod 405 are shown as semi-transparent.

The sprocket and locking mechanism 400 of FIGS. 4A through 4E is similar to the sprocket and locking mechanism 200 of FIGS. 2A through 2I and the sprocket and locking mechanism 300 of FIGS. 3A through 3D.

The sprocket and locking mechanism 400 of FIGS. 4A through 4E includes a mounting bracket 402 for securing the mechanism to the front wall of the trailer (e.g., by bolts), and for supporting an optional housing cover 422. As shown, the mounting bracket 402 includes flanged sides, and the housing cover 422 is generally U-shaped and fits over the flanged sides, allowing the housing cover 422 to be permanently secured to the mounting bracket 402 (e.g., by welding) or removably attached by (for example) bolts and nuts. The mounting bracket 402 may be metal, but the housing cover 422 may be metal or plastic.

A collar 403 may be mounted over a portion of the mounting bracket 402, for supporting a connecting shaft (not shown) for connection to the tarp shaft, around which the tarp is rolled and unrolled. As noted above, the connecting shaft need not be a separate structure from the tarp shaft, but may instead be integrally formed with the tarp shaft and merely have a smaller circumference than the tarp shaft.

In the sprocket and locking mechanism 400 of FIGS. 4A through 4E, the crank rod 405 and crank handle 401 are coupled to the connecting shaft by sprocket 406. The crank rod 405 for the sprocket and locking mechanism 400 has a multi-piece construction, and includes an arm 425, a sleeve 426, and a generally L shaped rod 427. The arm 425 is flat and bent, and terminates at one end with a collar 428. The collar 428 engages with the sprocket 406 in a manner such that rotation of the crank rod 405 using the crank handle 401 causes rotation of the tarp shaft. However, the collar 428 is removable from the sprocket 406, so that the crank rod 405 and the crank handle 401 may be completed removed from the remainder of the sprocket and locking mechanism 400. The collar 428 is secured to the sprocket 406 by a threaded bolt, in the exemplary embodiment shown.

The L shaped rod 427 portion of the crank rod 405 is received at one end by the sleeve 426 and retained in the sleeve 426 by a spring 407. The spring 407 holds the L shaped rod 427 portion of the crank rod 205 in position based on the force of the spring 407. A pin 408 through the L shaped rod 427 that is received by grooves in the sleeve 426 secure the L shaped rod 417 and crank handle 401 in one of either a deployed position (shown in FIGS. 4A through 4E) or a stowed position (not shown) substantially perpendicular to the deployed position. The grooves on the end of the sleeve 426 are sized to receive the pin 408 through the L shaped rod 427, to thereby hold the L shaped rod 427 in position (under the biasing force of spring 407) with the crank handle 401 either deployed or stowed.

The sprocket 406 includes a central shaft that includes an axial bore for receiving one end of the connecting shaft or tarp shaft. One end of the sprocket 406 includes locking teeth 413, for selectively locking the connecting shaft and/or the tarp shaft against any rotation or preventing rotation of the connecting shaft and/or the tarp shaft in at least one direction. Tightening or loosening of a retainer bolt holding the spring-biased pawl 424 in place can shift the mechanism from locking the connecting shaft and/or the tarp shaft against any rotation, based on engagement of the pawl 424 with the locking teeth 413 on the sprocket 406, to merely preventing or inhibiting rotation in one direction, providing a ratcheting action.

The sprocket of the present disclosure facilitates management of a crank handle and position locking with optional bidirectional ratcheting. The transverse bore, pin(s), and spring allow the crank handle to be deployed for use or stowed out of the way during travel. The locking teeth allow the tarp to be locked in position (rolled or unrolled). With optional pawls, bidirectional ratcheting may be provided. Because the sprocket can be fabricated from molded plastic, configured to slide over a portion of (or be coupled to) the tarp shaft, the features described may be provided for relatively low cost.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A trailer tarp system, comprising:
   a shaft portion that is part of or coupled to a tarp shaft about which a tarp is rolled;
   a sprocket having an axial bore fitting over the shaft portion, the sprocket including
      a plurality of locking teeth projecting around a periphery of one end of the sprocket,
      a crank bore through a second end of the sprocket and transverse to the axial bore, and
      at least two grooves on a surface of the sprocket surrounding the crank bore; and
   a locking lever pivotably mounted to control movement of at least one locking structure into and out of a space between two of the locking teeth.

2. The trailer tarp system of claim 1, further comprising:
   a crank rod having a first end and a second end, the first end extending through the crank bore and supporting at least one pin selectively engaging with either a first of the at least two grooves or a second of the at least two grooves, the second end supporting a crank handle; and
   a spring between the sprocket and one or more protrusions on the crank rod, the spring holding the at least one pin in engagement with the one of the at least two grooves,
   wherein the crank handle is deployed when the at least one pin is engaged with the first of the at least two grooves and the crank handle is stowed when the at least one pin is engaged with the second of the at least two grooves.

3. The trailer tarp system of claim 1, wherein the at least one locking structure comprises a projection from an end of the locking lever.

4. The trailer tarp system of claim 1, wherein the at least one locking structure comprises a first pawl and a second pawl, each of the first and second pawls forming a rachet mechanism for rotation of the shaft portion in one of two different directions when the locking lever is moved to a corresponding one of two extremes of a range of movement.

5. The trailer tarp system of claim 1, further comprising:

a locking mechanism housing enclosing a portion of the sprocket including the locking teeth with a remainder of the sprocket projecting through an opening in the locking mechanism housing.

6. The trailer tarp system of claim 1, further comprising:
a tarp housing enclosing at least a portion of the tarp shaft and the tarp, wherein the shaft portion protrudes through an opening in the tarp housing.

7. A trailer including the trailer tarp system of claim 1, the trailer comprising:
a frame having a hitch and a stand at a first end;
a cargo region supported by the frame and formed by a bed, sidewalls along sides of the bed, and a front wall across a front of the bed, wherein the cargo region may be raised relative to the frame; and
a gate pivotably mounted to top portions of the sidewalls across a rear of the bed, the gate configured to swing outward relative to the cargo region around a top edge of the gate.

8. A trailer tarp system, comprising:
a shaft portion that is part of or coupled to a tarp shaft about which a tarp is rolled;
a sprocket having an axial bore fitting over the shaft portion, the sprocket including
a crank bore through a second end of the sprocket and transverse to the axial bore, and
at least two grooves on a surface of the sprocket surrounding the crank bore; and
a crank rod having a first end and a second end, the first end extending through the crank bore and supporting at least one pin selectively engaging with either a first of the at least two grooves or a second of the at least two grooves, the second end supporting a crank handle; and
a spring between the sprocket and one or more protrusions on the crank rod, the spring holding the at least one pin in engagement with the one of the at least two grooves,
wherein the crank handle is deployed when the at least one pin is engaged with the first of the at least two grooves and the crank handle is stowed when the at least one pin is engaged with the second of the at least two grooves.

9. The trailer tarp system of claim 8, wherein the sprocket further includes a plurality of locking teeth projecting around a periphery of one end of the sprocket, the trailer tarp system further comprising:
a locking lever pivotably mounted to control movement of at least one locking structure into and out of a space between two of the locking teeth.

10. The trailer tarp system of claim 9, wherein the at least one locking structure comprises a projection from an end of the locking lever.

11. The trailer tarp system of claim 9, wherein the at least one locking structure comprises a first pawl and a second pawl, each of the first and second pawls forming a rachet mechanism for rotation of the shaft portion in one of two different directions when the locking lever is moved to a corresponding one of two extremes of a range of movement.

12. The trailer tarp system of claim 9, further comprising:
a locking mechanism housing enclosing a portion of the sprocket including the locking teeth with a remainder of the sprocket projecting through an opening in the locking mechanism housing.

13. The trailer tarp system of claim 8, further comprising:
a tarp housing enclosing at least a portion of the tarp shaft and the tarp, wherein the shaft portion protrudes through an opening in the tarp housing.

14. A trailer including the trailer tarp system of claim 8, the trailer comprising:
a frame having a hitch and a stand at a first end;
a cargo region supported by the frame and formed by a bed, sidewalls along sides of the bed, and a front wall across a front of the bed, wherein the cargo region may be raised relative to the frame; and
a gate pivotably mounted to top portions of the sidewalls across a rear of the bed, the gate configured to swing outward relative to the cargo region around a top edge of the gate.

15. A trailer tarp system, comprising:
a shaft portion that is part of or coupled to a tarp shaft about which a tarp is rolled;
a sprocket having an axial bore fitting over the shaft portion, the sprocket including
a plurality of locking teeth projecting around a periphery of one end of the sprocket, and
a crank bore through a second end of the sprocket and transverse to the axial bore; and
a locking lever pivotably mounted to control movement of at least one locking structure into and out of a space between two of the locking teeth;
a crank rod having a first end and a second end, the first end extending through the crank bore and the second end supporting a crank handle; and
a spring between the sprocket and one or more protrusions on the crank rod,
wherein the crank handle is moveable between a deployed position for travel and a stowed position for use in rolling or unrolling the tarp.

16. The trailer tarp system of claim 15, wherein the sprocket further comprises two grooves on a surface of the sprocket surrounding the crank bore,
wherein the crank rod further comprises two pins extending through an end of the crank rod and selectively engaging with either a first of the two grooves or a second of least two grooves,
wherein the spring holds the at least two pins in engagement with one of the two grooves,
wherein the crank handle is deployed when the two pins are engaged with the first of the at least two grooves and the crank handle is stowed when the two pins are engaged with the second of the at least two grooves.

17. The trailer tarp system of claim 15, wherein the at least one locking structure comprises a projection from an end of the locking lever.

18. The trailer tarp system of claim 15, wherein the at least one locking structure comprises a first pawl and a second pawl, each of the first and second pawls forming a rachet mechanism for rotation of the shaft portion in one of two different directions when the locking lever is moved to a corresponding one of two extremes of a range of movement.

19. The trailer tarp system of claim 15, further comprising:
a locking mechanism housing enclosing a portion of the sprocket including the locking teeth with a remainder of the sprocket projecting through an opening in the locking mechanism housing; and
a tarp housing enclosing at least a portion of the tarp shaft and the tarp, wherein the shaft portion protrudes through an opening in the tarp housing.

20. A trailer including the trailer tarp system of claim 15, the trailer comprising:
a frame having a hitch and a stand at a first end;
a cargo region supported by the frame and formed by a bed, sidewalls along sides of the bed, and a front wall across a front of the bed, wherein the cargo region may be raised relative to the frame; and a gate pivotably mounted to top portions of the sidewalls across a rear of the bed, the gate configured to swing outward relative to the cargo region around a top edge of the gate.

\* \* \* \* \*

UNITED STATES PATENT AND TRADEMARK OFFICE
CERTIFICATE OF CORRECTION

PATENT NO. : 12,179,568 B1
APPLICATION NO. : 18/783083
DATED : December 31, 2024
INVENTOR(S) : Franz Hiebert et al.

Page 1 of 1

It is certified that error appears in the above-identified patent and that said Letters Patent is hereby corrected as shown below:

In the Specification

In Column 3, Line 20, "socket" should read --sprocket--;

In Column 5, Line 27, "417" should read --427--;

In the Claims

In Column 8
Claim 15, Line 29, "deployed" should read --stowed--;
Claim 15, Line 30, "stowed" should read --deployed--.

Signed and Sealed this
Nineteenth Day of August, 2025

Coke Morgan Stewart
*Acting Director of the United States Patent and Trademark Office*